UNITED STATES PATENT OFFICE.

MYRTIL KAHN AND FRIEDRICH RUNKEL, OF ELBERFELD, GERMANY, ASSIGNORS TO THE FARBENFABRIKEN OF ELBERFELD COMPANY, OF NEW YORK, N. Y.

BLUISH-RED DYE.

SPECIFICATION forming part of Letters Patent No. 603,009, dated April 26, 1898.

Application filed November 19, 1897. Serial No. 659,187. (Specimens.) Patented in England December 4, 1894, No. 23,584; in France April 20, 1895, No. 246,760, and in Italy June 30, 1895, XXX, 38,758, LXXVI, 51.

*To all whom it may concern:*

Be it known that we, MYRTIL KAHN and FRIEDRICH RUNKEL, doctors of philosophy, chemists, (assignors to the FARBENFABRIKEN OF ELBERFELD COMPANY, of New York,) have invented a new and useful Improvement in the Manufacture of Bluish-Red Dye, (for which the Farbenfabriken, vormals Fr. Bayer & Co., of Elberfeld, Germany, has already obtained Letters Patent in England, No. 23,584, dated December 4, 1894; in France, No. 246,760, dated April 20, 1895, and in Italy, Reg. Gen., Vol. XXX, No. 38,758, Reg. Att., Vol. LXXVI, No. 51, dated June 30, 1895;) and we hereby declare the following to be a clear and exact description of our invention.

Our invention relates to the production of a new tetrazo dyestuff by combining one molecule of tetrazotized diamidodiphenylaminsulfo-acid having the formula

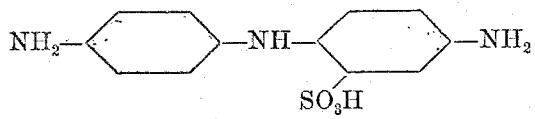

with two molecules of metaphenylenediamin.

In carrying out our new process practically we can proceed as follows: Twenty-eight kilos, by weight, of finely-divided diamidodiphenylaminsulfo-acid are dissolved in a mixture of seventy-three kilos, by weight, of concentrated hydrochloric acid (containing thirty per cent. of HCl) and five hundred liters of water and diazotized in the usual manner by means of fourteen kilos, by weight, of sodium nitrite dissolved in fifty liters of water, keeping the temperature of the reaction mixture at zero. The resulting tetrazo solution is stirred into a cold solution prepared by dissolving twenty-two kilos, by weight, of metaphenylenediamin and fifty-five kilos, by weight, of sodium acetate ($NaC_2H_3O_2 + 3H_2O$) in two hundred liters of water. The mixture thus obtained is heated to about 50° centigrade and subsequently mixed with a hot concentrated solution of twenty-three kilos, by weight, of sodium carbonate ($Na_2CO_3$). The reaction mixture is then heated to about 100° centigrade, and common salt is added in order to complete the separation of the finished dyestuff, which is finally filtered, pressed, and dried. It has the formula

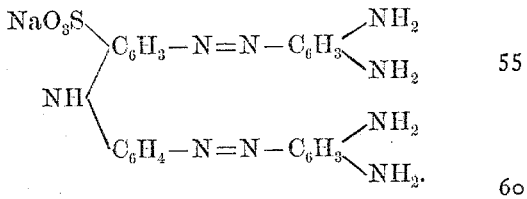

When dry and pulverized, the new dyestuff represents a dark-brown powder, which when rubbed exhibits a green metallic luster. It is soluble in water, yielding a red solution, from which a black precipitate is obtained on the addition of a dilute hydrochloric or sulfuric acid. The coloring-matter dissolves in a twenty-per-cent.-ammonia solution with a red color and is soluble in concentrated sulfuric acid (66° Baumé) with a bluish-black color, which turns into violet on the addition of a small quantity of ice, while a black flaky precipitate is separated on the addition of a larger quantity of ice to the sulfuric-acid solution.

The new dyestuff yields on unmordanted cotton intense-bluish-red shades, which when treated with a solution of diazotized paranitranilin and sodium acetate change into intense-brown shades fast against washing.

Having now described our invention and in what manner the same is to be performed, what we claim as new, and desire to secure by Letters Patent, is—

1. The process for producing a new tetrazo coloring-matter by combining one molecule of the tetrazo derivative of the diamidodiphenylaminsulfo-acid having the formula

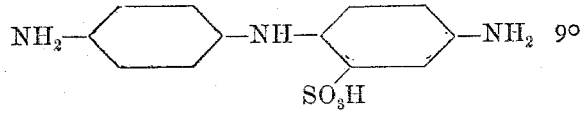

with two molecules of metaphenylenediamin substantially as described.

2. As a new article of manufacture the new tetrazo coloring-matter obtainable from one molecule of the tetrazo derivative of diamidodiphenylaminsulfo-acid with two molecules of metaphenylenediamin being an alkaline salt of the acid having the formula

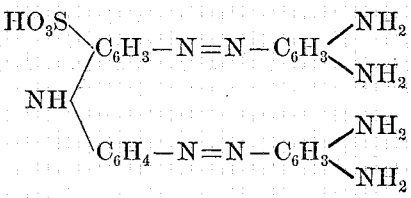

and which is a dark-brown powder, soluble in water yielding a red solution from which a black precipitate is obtained on the addition of dilute hydrochloric or sulfuric acid, soluble in concentrated sulfuric acid (66° Baumé) with a bluish-black color which turns into violet on the addition of a small quantity of ice while a black flaky precipitate is obtained on the addition of a larger quantity of ice to the sulfuric-acid solution, yielding on unmordanted cotton intense-bluish-red shades which when treated with a solution of diazotized paranitranilin and sodium acetate change into intense-brown shades fast against washing substantially as described.

In testimony whereof we have signed our names in the presence of two subscribing witnesses.

MYRTIL KAHN.
FRIEDRICH RUNKEL.

Witnesses:
R. E. JAHN,
OTTO KÖNIG.